US006924832B1

(12) United States Patent
Shiffer et al.

(10) Patent No.: US 6,924,832 B1
(45) Date of Patent: Aug. 2, 2005

(54) METHOD, APPARATUS & COMPUTER PROGRAM PRODUCT FOR TRACKING OBJECTS IN A WARPED VIDEO IMAGE

(75) Inventors: Katerina L. Shiffer, San Jose, CA (US); John Louis Warpakowski Furlan, Belmont, CA (US)

(73) Assignee: Be Here Corporation, Fremont, CA (US)

(*) Notice: Subject to any disclaimer, the term of this patent is extended or adjusted under 35 U.S.C. 154(b) by 430 days.

(21) Appl. No.: 09/659,621

(22) Filed: Sep. 11, 2000

Related U.S. Application Data

(63) Continuation-in-part of application No. 09/589,645, filed on Jun. 7, 2000, which is a continuation-in-part of application No. 09/131,186, filed on Aug. 7, 1998.

(51) Int. Cl.[7] ................................................. H04N 7/18

(52) U.S. Cl. ............................................ 348/36; 348/39

(58) Field of Search ........ 348/36–39; 375/240.1–240.29

(56) References Cited

U.S. PATENT DOCUMENTS

| 2,146,662 A | 2/1939 | Van Albada |
| 2,244,235 A | 6/1941 | Ayres |
| 2,304,434 A | 12/1942 | Ayres |
| 2,628,529 A | 2/1953 | Braymer |
| 2,654,286 A | 10/1953 | Cesar |
| 3,203,328 A | 8/1965 | Brueggeman |

(Continued)

FOREIGN PATENT DOCUMENTS

| FR | 1234341 | 5/1960 |
| GB | 2 221 118 A | 1/1990 |
| GB | 2289820 | 11/1995 |
| JP | I 2-127877 | 11/1988 |

OTHER PUBLICATIONS

Supplemental Information Disclosure Statement in re: the Application of Steven D. Zimmerman, et al. U.S. Appl. No. 08/662,410; 08 Pages including PTO 1449 Form citing 19 references. U.S. Appl. No. 08/662,410; filed Jul. 12, 1996. filed: Jul. 12, 1996.

Heckbert, P., "Survey of Texture Mapping" IEEE CG&A, Nov. 1986, pp. 56–67.

Defendants IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 08, 1997, in U.S.D.C., Eastern District of Tennessee.

Defendant IPI's Composit Exhibit List, Civil Action of nteractive Pictures Corporation, F/K/A Omniview, Inc. v. Infinite Pictures, Inc. and Bill Tillman, Case No. 3–96–849. Filed: Jan. 05, 1998, in U.S.D.C., Eastern District of Tennessee. pp.: 20.

(Continued)

*Primary Examiner*—Andy Rao
(74) *Attorney, Agent, or Firm*—Edward S. Mao

(57) ABSTRACT

Apparatus, methods and computer program products are disclosed that track movement or a moving object through a warped video image. The warped video image can result from a video camera attached to a warping lens such as a wide-angle lens or panoramic lens. Some embodiments allow a user to select the portion of the image that interests the user for tracking. Other embodiments automatically select and track movement through the warped video image without input from a user. Still other embodiments track when movement comes into proximity with an area-of-interest and will raise an alarm that can be used to start recording of the warped video image or to trigger other alarm responses. Yet other embodiments change the bandwidth allocated to portions of the warped video image sent over a network responsive to the tracked movement so that the movement stays in a quality view.

52 Claims, 7 Drawing Sheets

U.S. PATENT DOCUMENTS

| | | |
|---|---|---|
| 3,205,777 A | 9/1965 | Benner |
| 3,229,576 A | 1/1966 | Rees |
| 3,692,934 A | 9/1972 | Herndon |
| 3,723,805 A | 3/1973 | Scarpino et al. |
| 3,785,715 A | 1/1974 | Mecklenborg |
| 3,832,046 A | 8/1974 | Mecklenborg |
| 3,846,809 A | 11/1974 | Pinzone et al. |
| 3,872,238 A | 3/1975 | Herndon |
| 3,934,259 A | 1/1976 | Krider |
| 3,998,532 A | 12/1976 | Dykes |
| 4,012,126 A | 3/1977 | Rosendahl et al. |
| 4,017,145 A | 4/1977 | Jerie |
| 4,038,670 A | 7/1977 | Seitz |
| 4,058,831 A | 11/1977 | Smith |
| 4,078,860 A | 3/1978 | Globus et al. |
| 4,157,218 A | 6/1979 | Gordon et al. |
| 4,190,866 A | 2/1980 | Lukner |
| 4,241,985 A | 12/1980 | Globus et al. |
| D263,716 S | 4/1982 | Globus et al. |
| 4,326,775 A | 4/1982 | King |
| 4,395,093 A | 7/1983 | Rosendahl et al. |
| 4,429,957 A | 2/1984 | King |
| 4,463,380 A | 7/1984 | Hooks, Jr. |
| 4,484,801 A | 11/1984 | Cox |
| 4,518,898 A | 5/1985 | Tarnowski et al. |
| 4,549,208 A | 10/1985 | Kamejima et al. |
| 4,561,733 A | 12/1985 | Kreischer |
| 4,566,763 A | 1/1986 | Greguss |
| 4,578,682 A | 3/1986 | Hooper et al. |
| 4,593,982 A | 6/1986 | Rosset |
| 4,602,857 A | 7/1986 | Woltz et al. |
| 4,656,506 A | 4/1987 | Ritchey |
| 4,661,855 A | 4/1987 | Gulck |
| 4,670,648 A | 6/1987 | Hall et al. |
| 4,728,839 A | 3/1988 | Coughlan et al. |
| 4,736,436 A | 4/1988 | Yasukawa et al. |
| 4,742,390 A | 5/1988 | Francke et al. |
| 4,751,660 A | 6/1988 | Hedley |
| 4,754,269 A | 6/1988 | Kishi et al. |
| 4,761,641 A | 8/1988 | Schreiber |
| 4,772,942 A | 9/1988 | Tuck |
| 4,797,942 A | 1/1989 | Burt et al. |
| 4,807,158 A | 2/1989 | Blanton et al. |
| 4,835,532 A | 5/1989 | Fant |
| 4,858,002 A | 8/1989 | Zobel |
| 4,858,149 A | 8/1989 | Quarendon |
| 4,864,335 A | 9/1989 | Corrales |
| 4,868,682 A | 9/1989 | Shimizu et al. |
| 4,899,293 A | 2/1990 | Dawson et al. |
| 4,901,140 A | 2/1990 | Lang et al. |
| 4,907,084 A | 3/1990 | Nagafusa |
| 4,908,874 A | 3/1990 | Gabriel |
| 4,918,473 A | 4/1990 | Blackshear |
| 4,924,094 A | 5/1990 | Moore |
| 4,943,821 A | 7/1990 | Gelphman et al. |
| 4,943,851 A | 7/1990 | Lang et al. |
| 4,945,367 A | 7/1990 | Blackshear |
| 4,965,844 A | 10/1990 | Oka et al. |
| D312,263 S | 11/1990 | Charles |
| 4,974,072 A | 11/1990 | Hasegawa |
| 4,985,762 A | 1/1991 | Smith |
| 4,991,020 A | 2/1991 | Zwirn |
| 5,005,083 A | 4/1991 | Grage et al. |
| 5,020,114 A | 5/1991 | Fujioka et al. |
| 5,021,813 A | 6/1991 | Corrales |
| 5,023,725 A | 6/1991 | McCutchen |
| 5,038,225 A | 8/1991 | Maeshima |
| 5,040,055 A | 8/1991 | Smith |
| 5,048,102 A | 9/1991 | Tararine |
| 5,067,019 A | 11/1991 | Juday et al. |
| 5,068,735 A | 11/1991 | Tuchiya et al. |
| 5,077,609 A | 12/1991 | Manephe |
| 5,083,389 A | 1/1992 | Alperin |
| 5,097,325 A | 3/1992 | Dill |
| 5,115,266 A | 5/1992 | Troje |
| 5,130,794 A | 7/1992 | Ritchey |
| 5,142,354 A | 8/1992 | Suzuki et al. |
| 5,153,716 A | 10/1992 | Smith |
| 5,157,491 A | 10/1992 | Kassatly |
| 5,166,878 A | 11/1992 | Poelstra |
| 5,173,948 A | 12/1992 | Blackham et al. |
| 5,175,808 A | 12/1992 | Sayre |
| 5,185,667 A | 2/1993 | Zimmermann |
| 5,187,571 A | 2/1993 | Braun et al. |
| 5,189,528 A | 2/1993 | Takashima et al. |
| 5,200,818 A | 4/1993 | Neta et al. |
| 5,231,673 A | 7/1993 | Elenga |
| 5,259,584 A | 11/1993 | Wainwright |
| 5,262,852 A | 11/1993 | Eouzan et al. |
| 5,262,867 A | 11/1993 | Kojima |
| 5,280,540 A | 1/1994 | Addeo et al. |
| 5,289,312 A | 2/1994 | Hashimoto et al. |
| 5,305,035 A | 4/1994 | Schonherr et al. |
| 5,311,572 A | 5/1994 | Freides et al. |
| 5,313,306 A | 5/1994 | Kuban et al. |
| 5,315,331 A | 5/1994 | Ohshita |
| 5,341,218 A | 8/1994 | Kaneko et al. |
| 5,359,363 A | 10/1994 | Kuban et al. |
| 5,384,588 A | 1/1995 | Martin et al. |
| 5,396,583 A | 3/1995 | Chen et al. |
| 5,422,987 A | 6/1995 | Yamada |
| 5,432,871 A | 7/1995 | Novik |
| 5,434,617 A | 7/1995 | Bianchi |
| 5,444,476 A | 8/1995 | Conway |
| 5,446,833 A | 8/1995 | Miller et al. |
| 5,452,450 A | 9/1995 | Delory |
| 5,473,474 A | 12/1995 | Powell |
| 5,479,203 A | 12/1995 | Kawai et al. |
| 5,490,239 A | 2/1996 | Myers |
| 5,495,576 A | 2/1996 | Ritchey |
| 5,508,734 A | 4/1996 | Baker et al. |
| 5,530,650 A | 6/1996 | Bifero et al. |
| 5,537,155 A | 7/1996 | O'Connell et al. |
| 5,539,483 A | 7/1996 | Nalwa |
| 5,548,659 A | 8/1996 | Okamoto |
| 5,550,646 A | 8/1996 | Hassan et al. |
| 5,563,650 A | 10/1996 | Poelstra |
| 5,601,353 A | 2/1997 | Naimark et al. |
| 5,606,365 A | 2/1997 | Maurinus et al. |
| 5,610,391 A | 3/1997 | Ringlien |
| 5,612,533 A | 3/1997 | Judd et al. |
| 5,627,675 A | 5/1997 | Davis et al. |
| 5,631,778 A * | 5/1997 | Powell ..................... 359/724 |
| 5,633,924 A | 5/1997 | Kaish et al. |
| 5,649,032 A | 7/1997 | Burt et al. |
| 5,682,511 A | 10/1997 | Sposato et al. |
| 5,686,957 A | 11/1997 | Baker et al. |
| 5,714,997 A | 2/1998 | Anderson et al. |
| 5,729,471 A | 3/1998 | Jain et al. |
| 5,748,194 A | 5/1998 | Chen |
| 5,760,826 A | 6/1998 | Nayer |
| 5,761,416 A | 6/1998 | Mandet et al. |
| 5,764,276 A | 6/1998 | Martin et al. |
| 5,796,426 A | 8/1998 | Gullichsen et al. |
| 5,841,589 A | 11/1998 | Davis et al. |
| 5,844,520 A | 12/1998 | Guppy et al. |
| 5,850,352 A | 12/1998 | Moezzi et al. |
| 5,854,713 A | 12/1998 | Kuroda et al. |
| 5,877,801 A | 3/1999 | Martin et al. |
| 5,877,804 A | 3/1999 | Otsuki et al. |
| RE36,207 E | 5/1999 | Zimmerman et al. |

| | | | |
|---|---|---|---|
| 5,903,319 A | | 5/1999 | Busko et al. |
| 5,920,337 A | | 7/1999 | Glassman et al. |
| 5,990,941 A | | 11/1999 | Jackson et al. |
| 5,991,444 A | * | 11/1999 | Burt et al. .................. 382/232 |
| 5,995,095 A | * | 11/1999 | Ratakonda ............... 715/500.1 |
| 6,002,430 A | | 12/1999 | McCall et al. |
| 6,034,716 A | | 3/2000 | Whiting et al. |
| 6,037,988 A | * | 3/2000 | Gu et al. ............... 375/240.16 |
| 6,043,837 A | * | 3/2000 | Driscoll et al. ............... 348/36 |
| 6,072,494 A | | 6/2000 | Nguyen |
| 6,226,035 B1 | * | 5/2001 | Korein et al. ............... 348/335 |
| 6,252,975 B1 | * | 6/2001 | Bozdagi et al. ............. 382/107 |

OTHER PUBLICATIONS

Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 08, 1997, in U.S.D.C., Eastern District of Tennessee.

Plaintiff's Supplemental Trail Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 02, 1998, in U.S.D.C., Eastern District of Tennessee.

Ripley G. David, "DVI–A Digital Multimedia Technology". Communication of the ACM. Jul. 1989. vol. 32. No. 07. pp.: 811–820.

Onoe M. and Kuno Y., "Digital Processing CF Images Taken By Fish–Eye Lens". 1982. IEEE. pp.: 105–108.

Hamit, F., "Near–Fisheye CCD Camera Broadens View for Imaging". Advanced Imaging. Mar. 1993. pp.: 50–52.

Dixon, D., Golin, S., and Hasfield, I., "DVI Video/Graphics". Computer Graphics World reprinted from the Jul. 1987 edition of Computer Graphics World. pp.: 04.

Upstill, Steve. "Building Stronger Images". UNIX Review. Oct. 1988. vol. 6, No. 10. pp.: 63–73.

Greene, N., "Environment Mapping and Other Applications of the World Projections." Computer Graphics and Applications. Nov. 1986. IEEE Computer Society. vol. 06, No. 11. pp.: 21–29.

Hechbert P., "The PMAT and Poly User's Manual". Computer Graphics Lab. N.Y.I.T., Feb. 18, 1983. pp.: 1–29.

Heckbert, P., Fundamentals of Textured Mapping and Image Warping. Master Thesis. pp.: 86. Dated: Jun. 17, 1989.

Rebiai,M., Mansouri,S., Pinson,F., and Tichit, B., "Image Distortion From Zoom Lenses: Modeling and Digital Correction". International Broadcasting Convention. IEEE. Dated: Jul. 1992.

Charles Jeffrey, R., "All–Sky Reflector with "Invisible" Camera Support". Images from 1988 RTMC Proceedings. pp.: 79–80.

Roger W. Sinnott, "Scientific Library Gleaning for ATMs". Sky & Telescope. Aug. 1986. pp.: 186.

Charles et al., "How to Build and Use an All–Sky Camera." Astronomy. Apr. 1987. pp.: 64–70.

Deutsch, Cludia H., "One Camera That Offers Many Views". The New York Times.

Johnson, Colin R., "Imaging System Sees All". Electronic Engineering Times. Dec. 25, 1996. pp.: 1&98.

"Panospheric Camera Expands Horizon". pp.: 01.

"Panospheric Camera Developed at Carnegie Mellon Expands Horizon". pp.: 01.

Castleman, K., "Digital Image Processing". Prentice Hall. 1979. pp.: 110–135, 383–400,408.

Castleman, K., "Digital Image Processing". Prentice Hall. 1996. pp.: 125–127, 140–141.

Shah, S., A Simple Calibration Procedure For Fish–Eye (High Distortion) Lens. IEEE. 1994. pp.: 3422–3427.

"Gnomonic Projection". Map Projections—A Working Manual. pp.: 164–168.

Greene, N., and Heckbert, P., "Creating Raster Omnimax Images From Multiple Perspective Views Using The Elliptical Weighted Average Filter". IEEE. 1986. pp.: 21–27.

Fant, K., "A Nonaliasing, Real–Time Spatial Formation Technique". IEEE. 1986. pp.: 71–80.

Greene, William B., "Qualitative Image Processing Techniques". Digital Image Processing, A Systems Approach. $2^{nd}$ Edition. 1989. Van Nostrand Reinhold. pp.: 92–112.

Wolberg, George. Digital Image Warping (Introduction). 1990. IEEE Computer Society Press. pp.: 2.

Fu, K.S. et al., "Low–Level Vision". Robotics: Control, Sensing, Vision, and Intelligence. 1987.McGraw Hill Inc., pp.: 313–315.

Carlbom, Ingrid et al. "Planner Geometric Projections and Viewing Transformations". Computing Surveys. vol. 10, No. 04. Dec. 1978. pp.: 465–502.

Anderson, R.L., et al., "Omnidirectional Real time Imaging Using Digital Restoration". High Speed Photography SPIE. vol. 348. San Diego, CA. 1982. pp.: 807–814.

Laikin, Milton. "Wide Angle Lens System". 1980. International Design Conference (OSA). SPIE. vol. 237. 1980. pp. 530–532, 815–816.

Shah, Shisir et al., "Depth Estimation using Fish–Eye Lenses". IEEE. Department Of Electrical and Computer Engineering. University of Texas. 1994. pp.: 740–744.

Tsai, Roger Y., "A Versatile Camera Calibration Technique for High Accuracy 3–D Machine Vision Using Off–the–Shelf TV Cameras and Lenses". IEEE. Journals of Robotics and Automation. vol. RA–3. No. 04. Aug. 1987. pp.: 323–344.

Chang, Yuh–Lin et al., "Calibrating a Mobile Camera's Parameters". Pattern Recognition. vol. 26, No. 01. Dated.: 1983. pp.: 75–88.

Weng, Juyang. "Camera Calibration With Distortion Models and Accuracy". IEEE. Transactions On Pattern Analysis and Machine Intelligence. vol. 14, No. 10. Oct. 1992. pp.: 956–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp.: 713–720.

Nomura, Yoshihiko, et al., "A Simple Calibration Algorithm for High–Distortion Lens Camera". IEEE. Transaction on Pattern Analysis and Intelligence Machine. vol. 14, No. 11, Nov. 1992. pp.: 1095–1099.

International Broadcasting Convention Venue RAI Congress And Exhibition Centre, Amersterdam, The Netherlands. Jul. 3–7, 1992. pp.: 06, Including the title page.

Telerobotics International, Inc. "Optimizing The Camera And Positioning System For Telerobotic Workcite Viewing".

Miyamoto, K., "Fish Eye Lens". JOSA. Vol. 54. pp.: 1060–1061. Dated: Aug. 1964.

Defendant's IPI'Composite Exhibit List, Civil Action of Interactive Pictures Corporation, F/K/A Omniview, Inc. v. Infinite Pictures, Inc. and Bill Tillman. Case No. 3–96–849. Filed: Jan. 05, 1998 in U.S.D.C., Eastern District Of Tennessee. pp.: 20.

Baltes, M. "Bevet D'Intervention". Ref. No.: N 1.234.341.

Verity, John W. (edited by): Information Processing. Business Week. p.: 134E. Dated: Jul. 13, 1992.

Marbach, William D. (edited by): Developments To Watch. Business Week. p.: 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp.: 36–37. Dated: Sep. 1992.

Tulloch, Martha. "New Video Camera . . . " Photonics Spectra. pp.: 18–20. Dated: Oct. 1992.

Fisher, Timothy E., A Programmable Video Image Remapper. SPIE> vol. 938. pp.: 122–128. Dated: 1988.

Lippman, Andrew. Movie–Map: An Application Of The Optical Videodisc To Computer Graphics. pp.: 43. Dated: 1980.

Yelick, Steven. Anamorphic Image Processing. pp.: 1–37, Including Acknowledgement Page. Dated: 1980.

Chen, Shenchang Eric. Quick Time VR–An Image–Based Approach To Virtual Environment Navigation. pp.: 39. Dated: 1995.

Simon Rowe & Andrew Blake, Statistical Background Modelling For Tracking With a Virtual Camera, 1995, University of Oxford, England, http://www.robots.ox.ul/~smr/bmvc95/report.html.

Bobick & Pinhanez, Divide and Conquer: Using Approximate World Models to Control View–Based Algorithms, Oct. 1995, MIT.

Pinhanez & Bobick, Approximate Wold Models: Incorporating Qualitative and Linguistic Information into Vision Systems, 1996, MIT.

ROWE, Robust feature search for active tracking, 1995, Thesis for the Dept. of Engineering Science, University of Oxford.

* cited by examiner

METHOD, APPARATUS & COMPUTER PROGRAM PRODUCT FOR TRACKING OBJECTS IN A WARPED VIDEO IMAGE

This application is a Continuation-in-part of U.S. patent application Ser. No.: 09/589,645, filed Jun. 7, 2000, entitled *Method and Apparatus for Electronically Distributing Motion Panoramic Images* that is a continuation in part of U.S. patent application Ser. No.: 09/131,186 filed Aug. 7, 1998, also entitled *Method and Apparatus for Electronically Distributing Motion Panoramic Images*. Both of these applications are included by reference in their entirety.

BACKGROUND OF THE INVENTION

1. Field of the Invention

This invention relates to the field of warped video image processing. Specifically, embodiments of this invention include methods, apparatus, and computer program products for specifying objects in a warped video image and tracking the specified objects as they move through the video over time.

2. Background

A warped video image includes a set of video frames each frame containing non-rectilinear data. Such a warped video image can be created by capturing an image through a wide-angle lens, a catadioptric lens or some other distorting lens. The warped video image can be sent to a user/viewer who can then select portions of the data for transformation into a rectilinear form for presentation (such as by display).

Most video cameras only record a view within a small viewing angle. Thus, a typical video camera only captures an image in the direction that the camera is aimed. Such conventional cameras force viewers to look only at what the camera operator chooses to focus upon.

A video camera equipped with a wide-angle lens captures warped video images. For example, a panoramic camera constructed with a catadioptric lens captures a warped annular image that represents a substantially 360-degree scene that extends through a horizon line. Other wide-angle lenses (for example, a fish-eye lens) can generate warped circular images and may capture substantially a hemisphere (180-degree) view.

A portion of the warped video image can be transformed to provide a rectilinear representation of that portion of the warped video image. Thus, a viewer/user of the warped video image can individually select what portion of the warped video image is to be presented. As the user/viewer focuses on a moving object, the user/viewer must constantly adjust the presented view to track the moving object as it moves through the warped video image.

In some circumstances (for example, in a television broadcast control room), a user selects a view for presentation to other viewers. In this case, the viewer is unable to independently select the view because the user has done so.

There are many known techniques for tracking moving objects in a video. Some of these are described by U.S. Pat. No. 5,548,659, by Okamoto and entitled *Method and Apparatus for Detecting Changes in Dynamic Images*; by U.S. Pat. No. 5,877,804, by Otsuki et al. and entitled *Method and Apparatus for Moving Object Detection*; by U.S. Pat. No. 5,537,155, by O'Connell et al. and entitled *Method for estimating Motion in a Video Sequence*; U.S. Pat. No. 6,072,494, by Nguyen and entitled *Method and Apparatus for Real-Time Gesture Recognition*; by U.S. Pat. No. 5,434,617, and by Bianchi and entitled *Automatic Tracking Camera Control System*. In addition, other teachings are from *Statistical Background Modeling for Tracking With a Virtual Camera*, by Rowe and Blake; from *Divide and Conquer: Using Approximate World Models to Control View-Based Algorithms*, by Bobick and Pinhanez, and from *Approximate World Models: Incorporating Qualitative and Linguistic Information into Vision Systems*, by Pinhanez and Bobick. However, these techniques are not known to have been used to track movement or objects through a warped video image, nor to other aspects of the inventions disclosed within.

Conventional images are often delivered by electronic means. For example, television and the Internet deliver conventional images across wired and wireless electronic media. However, there are no standard means of delivering real-time panoramic images or wide-angle images electronically. Since panoramic images are so large and include so much data, it is difficult to deliver these images using conventional image transmission techniques. To further compound the problem, real-time motion panoramic images require a very high bandwidth channel for electronic distribution.

It would be advantageous to provide methods, apparatus, systems and program product solutions that allow a user/viewer to select an object-of-interest and to track it in real-time as the object-of-interest moves through a warped video image. In addition it would be advantageous to allocate bandwidth to the portions of the warped video image that include the tracked object-of-interest. Furthermore, it would be advantageous to monitor when the object-of-interest moves into an area-of-interest and to respond to such an occurrence.

SUMMARY OF THE INVENTION

Apparatus, methods and computer program products are disclosed that track movement or a moving object through a warped video image. The warped video image can result from a video camera attached to a warping lens such as a wide-angle lens or panoramic lens. Some embodiments allow a user to select the portion of the image that interests the user for tracking. Other embodiments automatically select and track movement through the warped video image without input from a user. Still other embodiments track when movement comes into proximity with an area-of-interest and will raise an alarm (a signal) that can be used to start recording of the warped video image or to trigger other alarm or signal responses (the alarm can be used to trigger typical surveillance systems, monitor traffic or interest generated by a display or attraction, or perform other operations responsive to the alarm response). Yet other embodiments change the bandwidth allocated to portions of the warped video image sent over a network responsive to the tracked movement so that the movement stays in a quality view.

One preferred embodiment is a computer-controlled method that includes a step of selecting a first view into a warped video image. The warped video image includes a plurality of frames. The method also includes the step of identifying an object-of-interest in a first set of frames of the plurality of frames and the step of tracking the object-of-interest through a subsequent set of frames of the plurality of frames.

Another preferred embodiment is a computing device that performs the steps of the computer-controlled method above.

Yet another preferred embodiment is a computer program product that provides computer readable data that can be executed by the computer to perform the steps of the computer-controlled method above.

Versions of these embodiments respond to where the object-of-interest is in the view and can respond by triggering an alarm or signal condition or by changing the bandwidth allocated to portions of the warped video image.

The foregoing and many other aspects of the present invention will no doubt become obvious to those of ordinary skill in the art after having read the following detailed description of a preferred embodiment that is illustrated in the various drawing figures.

DESCRIPTION OF THE PREFERRED EMBODIMENTS

Notations and Nomenclature

The following 'notations and nomenclature' are provided to assist in the understanding of the present invention and the preferred embodiments thereof.

Procedure—A procedure is a self-consistent sequence of computerized steps that lead to a desired result. These steps are defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps.

Overview

U.S. Pat. No. 6,043,837 is included by reference in its entirety. This patent discloses, among other things, at least one embodiment of a panoramic lens, the annular image captured by the panoramic lens, and at least one embodiment for sending a warped video image from a data source (such as a server computer) to a client such as (a client computer).

Detailed Description

Figure 1:
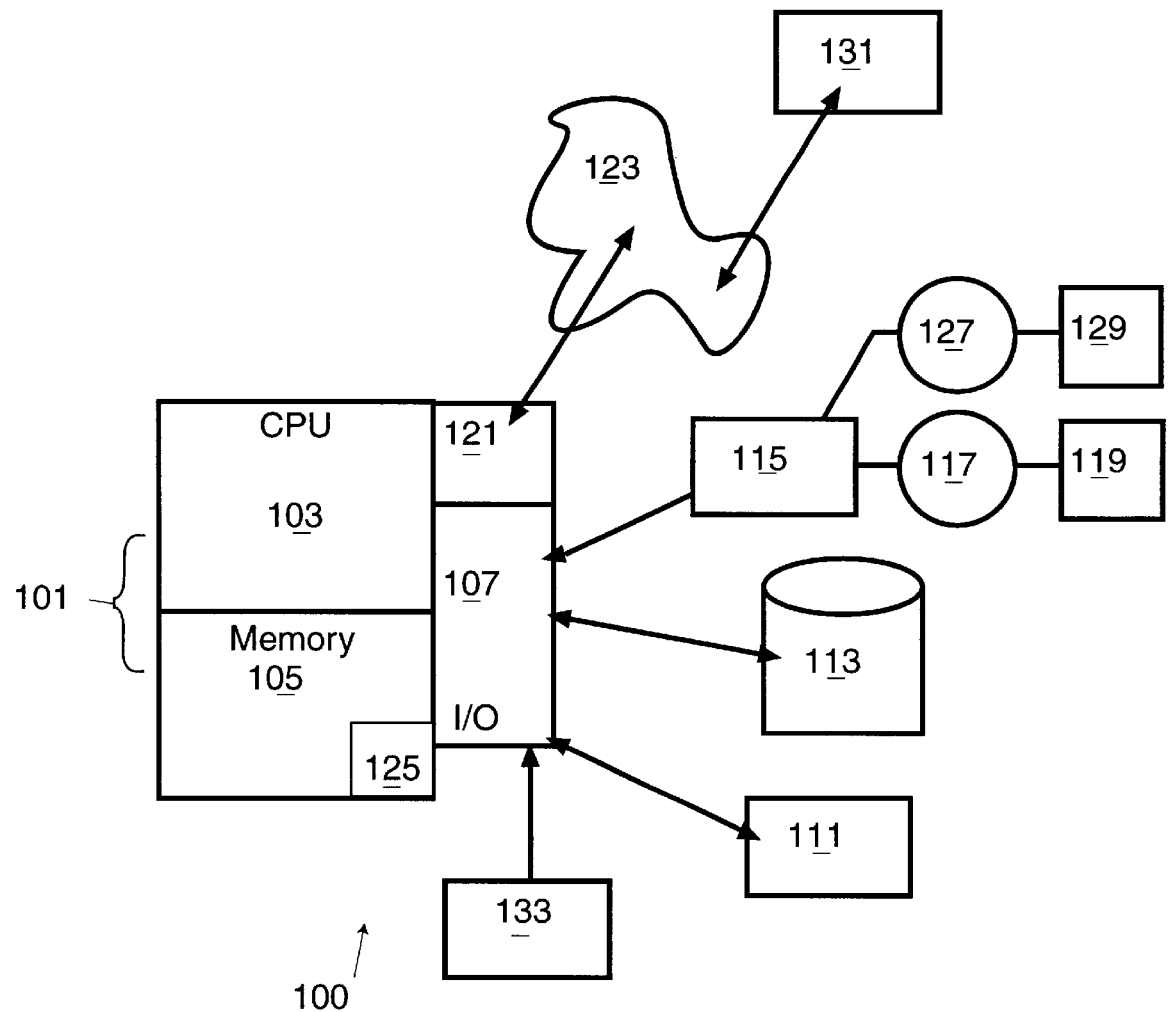
FIG. 1 illustrates a computer system capable of using the invention in accordance with a preferred embodiment.

FIG. 1 illustrates a computer system, indicated by general reference character 100, that incorporates the invention. The computer system 100 includes a processor 101 that includes a central processor unit (CPU) 103, a memory section 105 and an input/output (I/O) section 107. The I/O section 107 can be connected to a user interface 111, a disk storage unit 113 and/or a DVD/CD-ROM drive unit 115. The DVD/CD-ROM drive unit 115 can read a CD-ROM medium 117 that typically contains a program and data 119. The DVD/CD-ROM drive unit 115 (along with the CD-ROM medium 117 and/or a DVD medium 127) and the disk storage unit 113 comprise a file storage mechanism. Some embodiments of the invention include a network interface 121 that connects the computer system 100 to a network 123. Portions of the program and data 119 can be resident in a program memory 125 for execution by the CPU 103. The DVD medium 127 can contain motion image data 129 that can be read by the DVD/CD-ROM drive unit 115 for presentation by the user interface 111, other presentation device, or a display device. A client computer 131 can also access the warped video image through the network 123 from a server computer that includes the processor 101. In addition, motion images can be collected by a video camera 133 in real time.

One skilled in the art will understand that not all of the displayed features of the computer system 100 are required in some of the embodiments. Such a one will also understand that computers are used in many devices to cause the device to operate. These extend from toasters to navigational devices to televisions and beyond. The inventors' use of the term "computer system" includes any system that has circuitry that performs the steps of the invention as well as any general-purpose programmed computer. In addition, aspects of the network 123 can include a broadcast network, a wireless network, the Internet, a LAN, a WAN, a telephone network or other network.

One skilled in the art will understand that the program and data 119 can also reside on the DVD medium 127.

One preferred embodiment is used to track images through a panoramic video image. One skilled in the art will understand that the techniques described within can also be applied to other warped video images.

Figure 2:
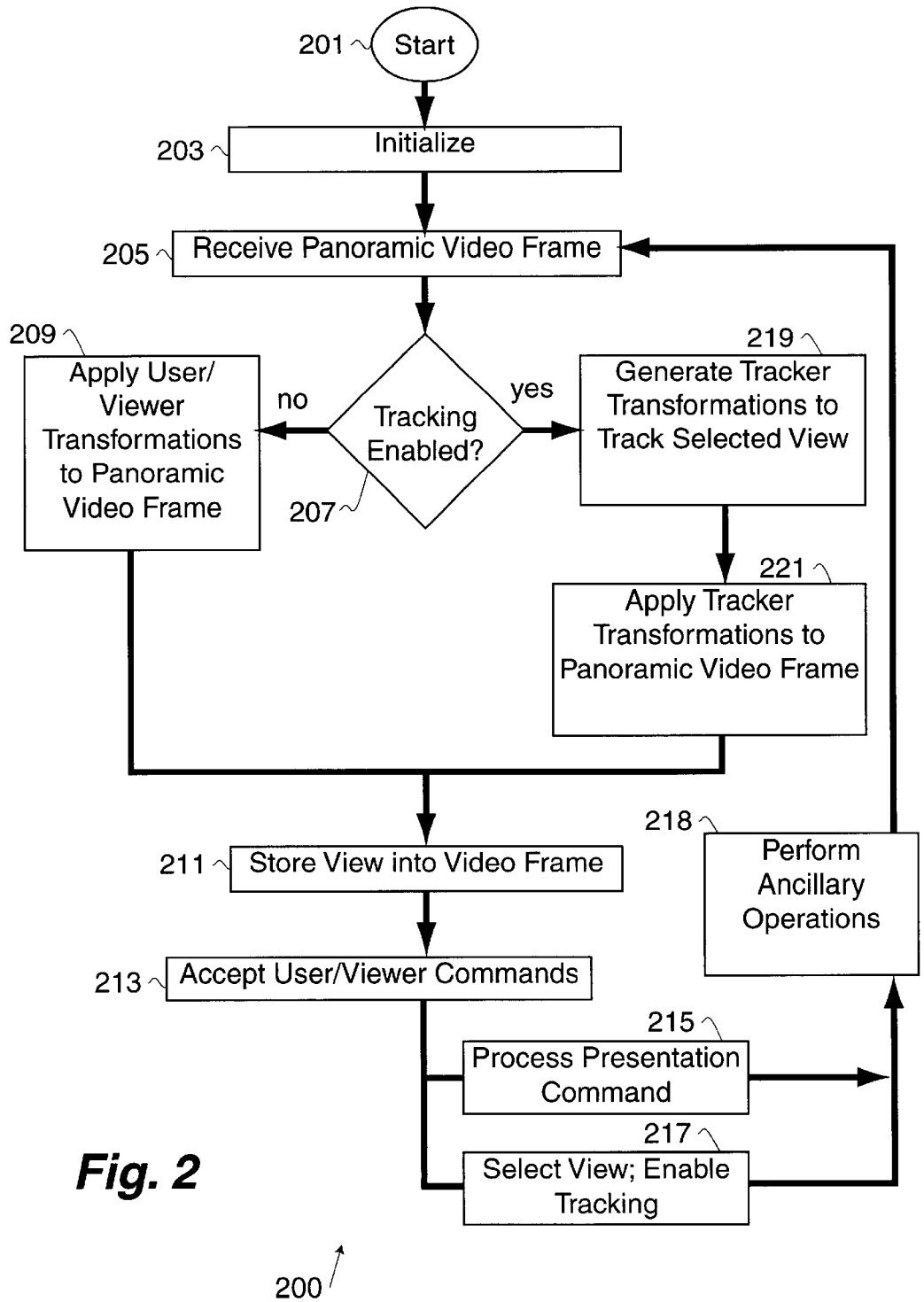
FIG. 2 illustrates a process that tracks an object-of-interest through a warped video image in accordance with one preferred embodiment.

FIG. 2 illustrates a tracking process 200 that can be used to select and track an object-of-interest as it moves through a warped video image in real-time. The warped video image can include a sequence of frames each containing data that represents a portion of the warped image and/or the entire image with portions that can have differing quality. In addition, the tracking process 200 can be used with a tiled or tiered warped video image as described in the previously referenced parent application. For a panoramic image, a substantially 360-degree scene extends through a horizon line.

The tracking process 200 can be used by a viewer of the warped video image and/or it can be used by a human or machine user. A user may or may not also be a viewer. However, a user can select an object for subsequent tracking for viewing by viewers who do not have access to the tracking process 200.

The tracking process 200 initiates at a 'start' terminal 201 and continues to an 'initialization' procedure 203 that initializes the tracking process 200. After initialization, the tracking process 200 continues to a 'receive panoramic video frame' procedure 205. The 'receive panoramic video frame' procedure 205 receives a video frame that contains panoramic data. The panoramic data can be in a warped annular form, in an un-warped form, or some other form that contains information from a portion of and/or the entirety of the panorama. Portions of the panoramic data can be of differing quality as discussed in the parent application. The video frame can be received over the network 123, from reading a CD or DVD on the DVD/CD-ROM drive unit 115, from the video camera 133, or from any other device that can provide panoramic video frames. After receiving the video frame, the tracking process 200 continues to a 'tracking decision' procedure 207.

The 'tracking decision' procedure 207 determines whether automatic tracking is enabled. Automatic tracking is enabled by operations performed by a user/viewer as is subsequently described with respect to FIG. 3A. If automatic tracking is not enabled, the tracking process 200 continues to an 'apply user/viewer transformations' procedure 209 that applies one or more user/viewer specified transformations to the warped video frame. Examples of such transformations include coordinate transformations, pan, rotation, zoom or other transformations that generate a view into the warped video frame.

Once the transformations are applied, a 'store view in video frame' procedure 211 stores the transformed data into a video frame suitable for presentation. Once stored in a video frame, the view can be (for example, but without limitation) presented to the viewer, transmitted to the client computer for presentation or storage, or stored on some computer-readable or video-readable media.

An 'accept user/viewer commands' procedure 213 accepts any commands that the user/viewer may have input. These commands can be input to the server computer or the client computer by manipulation of devices that communicate to the computer or by programs executed by a computer. These commands can include presentation commands that create or modify transformations that are applied to the warped video frame to generate a view. Examples (but without limitation) of such commands include pan, rotation and zoom commands. Once the user command is accepted, it is processed by either a 'process presentation command' procedure 215 or a 'select view; enable tracking' procedure 217. One skilled in the art will understand that the 'process presentation command' procedure 215 and the 'select view; enable tracking' procedure 217 are both procedures for processing commands and that they are illustrated separately to simplify the following discussion.

The 'process presentation command' procedure 215 parses the user's command and creates and/or modifies transformations that are applied to the warped video frame to generate a view.

The 'select view; enable tracking' procedure 217 allows the user/viewer to select a view containing an object-of-interest and to enable tracking as is subsequently described with respect to FIG. 3A and FIG. 3B.

An 'ancillary operations' procedure 218 can be used to perform operations responsive to the current view. As is subsequently described with respect to FIG. 5, one such operation can be an adjustment of the amount of the available bandwidth of the network interface 121 and the network 123 that is allocated to portions of the warped video frame so as to improve the presentation quality of the portions of the warped video frame that include the tracked object-of-interest (using techniques similar to those described in the parent application). Another operation is the triggering of an alarm or signal condition if the tracked object has entered area-of-interest. Other operations responsive to the tracked object can also be performed. One skilled in the art will understand that the alarm condition is a term that means something of interest has happened and can be a software signal among others. In surveillance situations, the alarm condition may invoke a physical alarm. However, in other situations, the alarm condition can invoke other operations that are normal responses to the condition.

The tracking process 200 continues to the 'receive panoramic video frame' procedure 205 for processing of the next warped video frame. The tracking process 200 continues until all the warped video frames are processed, the user/viewer disables or terminates the tracking process 200, or some other termination condition occurs.

Looking again at the 'tracking decision' procedure 207, if tracking is enabled, the tracking process 200 continues to a 'generate tracker transformations' procedure 219. As is subsequently described with respect to FIG. 4A, the 'generate tracker transformations' procedure 219 determines how the view should be changed to keep the object-of-interest contained within the view. The user/viewer can specify whether the transformation includes a magnification component to keep the object-of-interest substantially the same size as it moves through the warped video image. An 'apply tracker transformations' procedure 221 applies these transformations to the warped video frame to generate the view. The view containing the object-of-interest can be presented to a viewer in a number of ways (for example, presenting the view on a computer terminal, on video display, storing the view on a video disk, printing the view on a printer, etc.). In some embodiments, the view need not be presented at all times (for example, but without limitation, in an embodiment that determines when a tracked object comes into proximity with an area-of-interest and records the image while the condition exists).

One skilled in the art will understand that the tracking process 200 can be implemented using (for example, but without limitation) object-oriented programming practices, procedural programming practices, single or multiple threads of execution; and can be implemented using a general purpose computer, specialized circuitry or some combination of each.

Figure 3A:
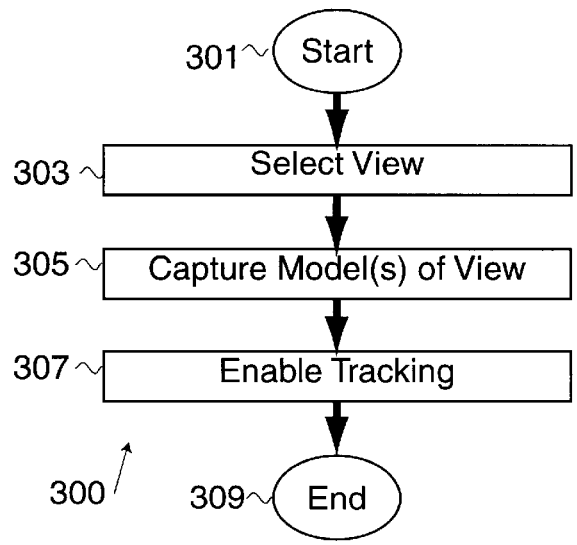
FIG. 3A illustrates one preferred embodiment of the 'select view; enable tracking' procedure 217 of FIG. 2.

FIG. 3A illustrates a 'select view and enable tracking' process 300 invoked by the 'select view; enable tracking' procedure 217 of FIG. 2. The 'select view and enable tracking' process 300 initiates at a 'start' terminal 301 and continues to a 'select view' procedure 303 that allows a user/viewer to identify the object-of-interest that the user/viewer desires to track. The user/viewer can specify the object-of-interest by using computer controls (for example the user interface 111) to include the object-of-interest in a bounding box and so specify an object box that contains the object-of-interest, by selecting a view and indicating that the object-of-interest is the portion of the view that moves in subsequent frames, or by using a combination of these approaches. One skilled in the art will understand that in some embodiments, multiple objects-of-interest can be specified and tracked. Where the presentation of the tracked objects-of-interest is via a display mechanism, the multiple objects-of-interest view can be displayed in separate views, can be displayed in a single view that includes the multiple objects-of-interest, can display the view containing the most prominent of the multiple objects-of-interest, can display the view containing the fastest moving object-of-interest, or can display the view having an object-of-interest in or near an area-of-interest.

In another preferred embodiment, the 'select view and enable tracking' process 300 can be configured to select moving pixels without user/viewer selection. In this embodiment, each frame is scanned to determine which pixels moved over time and one or more groups of pixels are automatically selected for tracking.

Once the view is selected (with or without the object box) the 'select view and enable tracking' process 300 continues to a 'capture view model' procedure 305 that processes the view and initializes one or more models that are used to track the object-of-interest as it moves through the panorama. The 'capture view model' procedure 305 is subsequently described with respect to FIG. 3B.

An 'enable tracking' procedure 307 enables tracking in the tracking process 200. The 'select view and enable tracking' process 300 completes through an 'end' terminal 309.

Figure 3B:
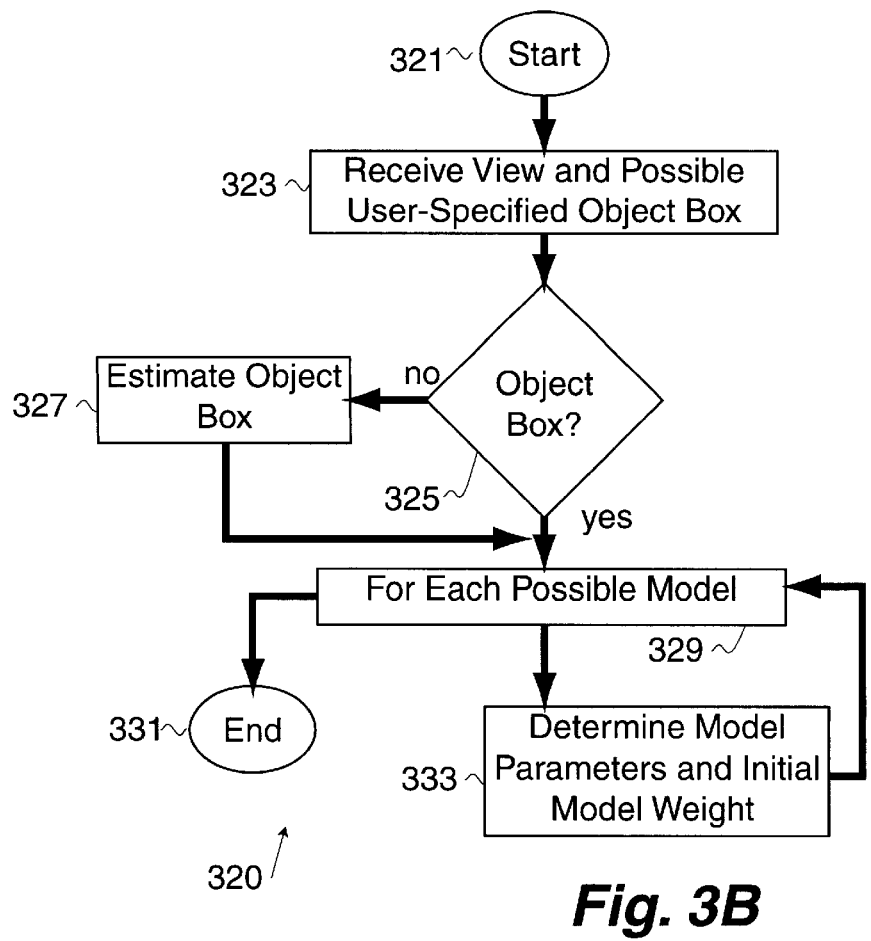
FIG. 3B illustrates one preferred embodiment of the 'capture view model' procedure 305 of FIG. 3A.

FIG. 3B illustrates a 'capture model' process 320 that is invoked by the 'capture view model' procedure 305 and initiates at a 'start' terminal 321. A 'receive view and/or object box' procedure 323 receives the view and possibly an object box as specified by the user/viewer at the 'select view' procedure 303 of FIG. 3B. An 'object box exists' decision procedure 325 determines whether the user/viewer has selected an object box. If no object box was specified, an 'estimate object box' procedure 327 automatically defines one. The 'estimate object box' procedure 327 operates by, for example, assuming the object-of-interest is in the middle of the presented view, selecting a seed area in the middle of the view, and determining the boundary around the seed area defined by a transition from the characteristics of the seed to some other characteristic (such as motion, color, texture, luminance or other characteristic of the seed that is well known in the art). Other techniques known to one skilled in the art can be utilized to estimate the object box if the user/viewer does not supply the object box at the 'receive view and/or object box' procedure 323.

Once an object box is defined the 'capture model' process 320 continues to an 'iterate models' procedure 329 that passes the view and object box to at least one of the available models for initialization. Once the models are initialized the 'select view and enable tracking' process 300 continues to an 'end' terminal 331.

Looking again at the 'iterate models' procedure 329; as each model is iterated, a 'determine model parameters and weight' procedure 333 initializes the model with respect to the object box and the view. The 'determine model parameters and weight' procedure 333 can operate by evaluating the pixels in the current and a subset of the previous frames to determine which models are better suited for tracking the object-of-interest represented by a group of pixels (a blob). Thus, a set of models is enabled based on the characteristics of a blob in the object box and in some cases how these characteristics have changed over a subset of the past frames. Each of the enabled models has an associated "weight value" that represents how well the model expects be able to track the particular characteristics of the blob in the object box. For example, a pixel motion model (such as shown in FIG. 4B) can evaluate the past history of how the blob currently in the object box have moved in the past—so as to predict how it will move in the future. For another example, a blob having a particular arrangement of color and relationships between the colors of the pixels within the blob can be identified. Other mechanisms known in the art can also be applied such as generating eigenvectors and eigenvalues identifying the blob, providing templates to match grayscale values, or applying edge map mechanisms among others.

A blob is a data representation of a portion of the light reflected off the object-of-interest and captured by a panoramic video camera. In one preferred embodiment the blob can be defined by specifying some combination of its center (with respect to the warped video image), its size and/or shape, a pixel motion map, a color map, a texture map and/or an edge map, a set of eigenaxes with corresponding eigenweights that represent the pixel arrangement that make up the blob or other image identification mechanisms.

As the object-of-interest is captured, the 'determine model parameters and weight' procedure 333 also computes the quality of the model as applied to the blob. For example, if the color map of the object-of-interest is similar to the color map of the surroundings, if the blob is too small, or if the blob is motionless for a sufficient period of time the corresponding color model, motion model, or texture model will be assigned a lower weight. If the blob specified by the user's object box yields models with insufficient weight, model can be disabled or the model's result rejected. In addition, if all the models generate a low weight (meaning that the specified object cannot be tracked) the object is rejected and tracking is not enabled.

Another preferred embodiment automatically selects an interesting area of the warped video image as the object-of-interest. It does so by detecting changes between adjacent video frames. These changes can include motion, changes in velocity, changes in texture, changes in color or some combination of these. In this embodiment, the user/viewer need not select a view containing the object-of-interest. Instead, the system automatically selects some interesting change. User/viewer preferences can be provided to prioritize the relative importance of the types of detected changes.

Figure 4A:
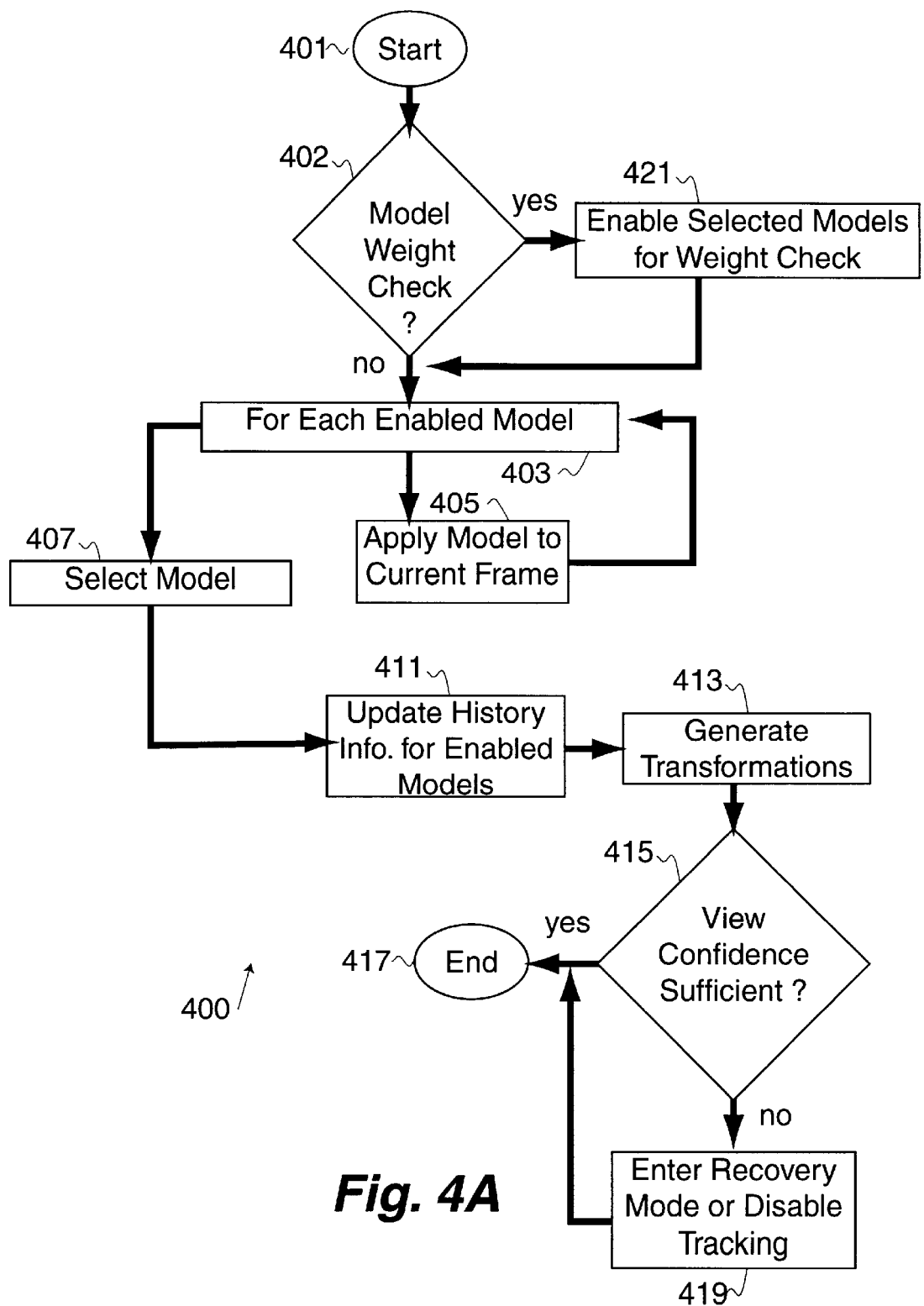
FIG. 4A illustrates one preferred embodiment of the 'generate tracker transformations' procedure 219 of FIG. 2.
Figure 4B:
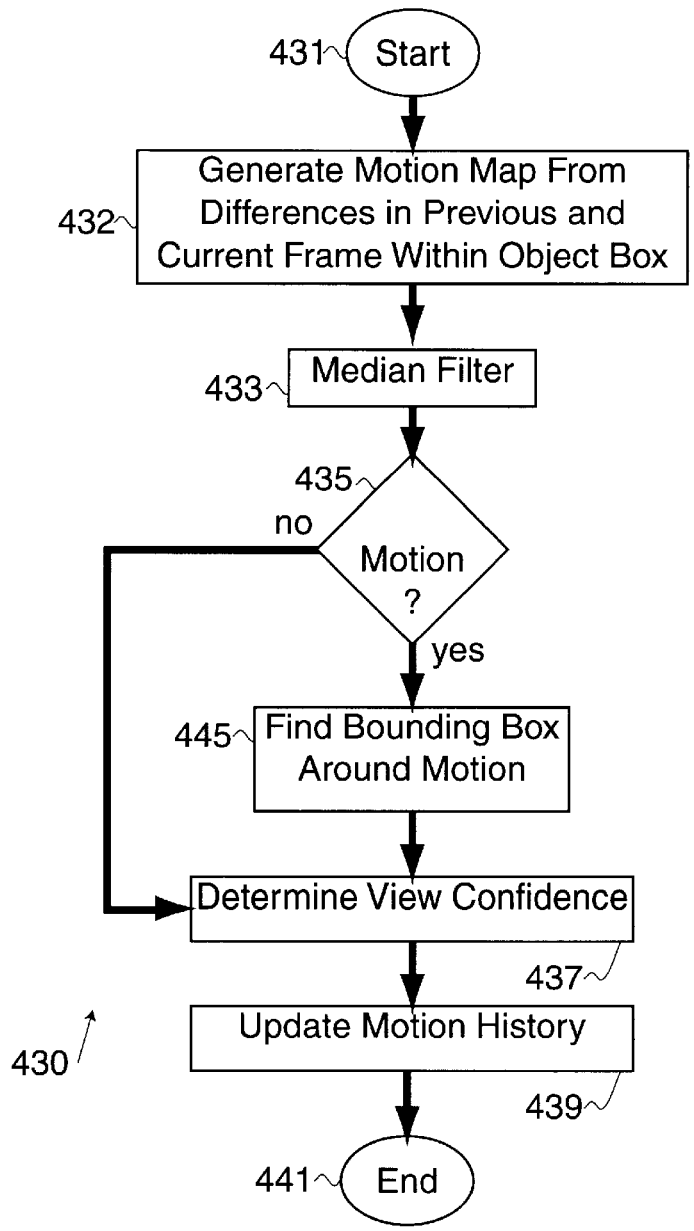
FIG. 4B illustrates a motion model tracking process invoked by the 'apply model' procedure 405 of FIG. 4A in accordance with a preferred embodiment.

FIG. 4A illustrates a 'generate tracker transformation' process 400 that can be invoked by the 'generate tracker transformations' procedure 219 of FIG. 2 and that initiates at a 'start' terminal 401. The 'generate tracker transformation' process 400 continues to a 'model weight check' decision procedure 402 that determines whether selected disabled models should be weight checked and possibly enabled as is subsequently described.

Regardless of the results of the 'model weight check' decision procedure 402 the 'generate tracker transformation' process 400 eventually continues to an 'iterate enabled models' procedure 403 that iterates each enabled tracking model. For each iterated model, an 'apply model' procedure 405 is applied to the pixels in a region surrounding where the object-of-interest was in the previous frame. Examples (but without limitation) of the available models are subsequently described with respect to FIG. 4B and FIG. 4C.

After all the enabled tracking models have been applied to the current frame, a 'select model' procedure 407 can select a model result by comparing the results, weight and confidence of each of the enabled models and selecting a model dependent on the model's weight, confidence, and agreement to the other models. In addition, the 'select model' procedure 407 can combine the results from the enabled models (responsive to the model's weight and confidence, and agreement between models) to generate a model result that is different from any of the results returned by the enabled models.

An 'update model history' procedure 411 updates the history for all the enabled modules. The model result from the 'select model' procedure 407 is used to update each enabled model. Thus, each enabled model has access to the current position of the object as represented by the model result as well as its own result. The history can include the last location of the blob in the warped video image, the last size of the blob, the velocity vector of the blob over the last 'n' seconds (such as captured by a Kalman filter), and the change in the size of the blob in the last 'n' seconds (again such as captured by a Kalman filter). One skilled in the art will understand that filters other than a Kalman filter can be used. In addition, the 'update model history' procedure 411 can cause the models to reevaluate their weight based on the model result from the 'select model' procedure 407.

Once the 'select model' procedure 407 has determined the model result, a 'generate transformations' procedure 413 generates the transforms that, when applied to the panorama, will position the object-of-interest substantially in the center (or other user/viewer specified location) of the view while optionally maintaining the object-of-interest at substantially the same size. The 'select model' procedure 407 also generates a confidence value that indicates a certainty that the object-of-interest (represented by the blob) was successfully tracked. This confidence value is passed to a 'view confidence sufficient' decision procedure 415 that determines whether the confidence value is sufficient to continue tracking. If so, the 'generate tracker transformation' process 400 completes through an 'end' terminal 417 and the transformations are applied at the 'apply tracker transformations' procedure 221 of FIG. 2. However, if the confidence level is insufficient the 'generate tracker transformation' process 400 continues to a 'recovery' procedure 419.

The 'recovery' procedure 419 can disable tracking (presenting an indication to the user/viewer where the object-of-interest was expected to be and where the object-of-interest was last known to be), and/or it can attempt to recover the object-of-interest in subsequent frames to handle the case where, for example, the object-of-interest has been occluded for a short time, and/or it can accept user/viewer input to help recapture the object-of-interest. After attempting recovery, the 'generate tracker transformation' process 400 completes through the 'end' terminal 417.

The user/viewer can specify threshold confidence value below which the user/viewer is notified that the tracking of the object-of-interest may have failed, that the tracker is attempting recovery, or if two similar blobs have been found.

Looking again at the 'model weight check' decision procedure 402, if the 'model weight check' decision procedure 402 determines that it should reevaluate and re-weight a selection of the available disabled models (the weights of the enabled models can be updated when they execute and/or at the 'update model history' procedure 411), the 'generate tracker transformation' process 400 continues to a 'enable weight check' procedure 421 that enables selected models. The 'model weight check' decision procedure 402 periodically (after some number of frames, after a period of time or in response to an event) invokes the 'enable weight check' procedure 421. If a model is enabled for weight check, it will be applied to the current frame with other enabled models. The weight-check-enabled model will re-evaluate its weight with respect to the current information in the object box, and if the re-evaluated weight is sufficient, the model will enable itself. In a preferred embodiment, there can be a limit on the number of models that can be enabled at any given time. In addition, there can be a limit on the number of models that are weight-check-enabled.

FIG. 4B illustrates a 'pixel motion tracker' process 430 that can be one of the models invoked by the 'apply model' procedure 405 of FIG. 4A. The 'pixel motion tracker' process 430 initiates at a 'start' terminal 431 and continues to a 'generate motion map' procedure 432 that compares the pixels in a region where the object-of-interest is expected to be from at least the previous frame and the current frame. This generates a motion map that indicates pixel motion in the region.

The region includes the position of the object-of-interest in the previous frame (for example, the region can be centered on this position). The size of the region is determined by the past history of the motion and size of the object-of-interest such that the region includes (but is not limited to) both the position of the object-of-interest in the previous frame and the expected position of the object-of-interest in the current frame.

Next, a 'median filter' procedure 433 filters out isolated pixel differences within the region without substantially altering the motion characteristics of the pixels within the region that may represent the object-of-interest.

Using the motion map, a 'motion' decision procedure 435 determines whether the object-of-interest is in motion. If no motion is detected, the 'pixel motion tracker' process 430 continues to a 'determine view confidence' procedure 437 that evaluates the confidence value for the view. The 'determine view confidence' procedure 437 can (for example, but without limitation) reduce the confidence value when the object box is too small or remains motionless for too long, reduce the confidence value when the boundary of pixels representing the object-of-interest changes shape, color, texture, and/or when the expected position of pixels representing the object-of-interest is sufficiently different from the actual position of pixels representing the object-of-interest.

An 'update motion history' procedure 439 maintains any model-specific history required by the operation of the model. This history can include (among others) previous motion maps, motion vectors, the search region, size and position of the object box, the previous image, and environmental information such as three-dimensional information about motionless objects in the warped video image. The 'update motion history' procedure 439 can also adjust the weight of the motion tracker model using the same or similar techniques as used in the 'determine model parameters and weight' procedure 333.

The 'pixel motion tracker' process 430 completes through an 'end' terminal 441.

Looking again at the 'motion' decision procedure 435, if motion is detected, the 'pixel motion tracker' process 430 continues to a 'find bounding box around motion' procedure 445 that updates the position and size of the object box around the object-of-interest. In the circumstance where the motion is insubstantially transverse to the warped video image the object box changes size but does not change position. Where there is a transverse component, the object box will change position and possibly size. The 'pixel motion tracker' process 430 continues through the 'determine view confidence' procedure 437 and eventually completes through the 'end' terminal 441.

Figure 4C:
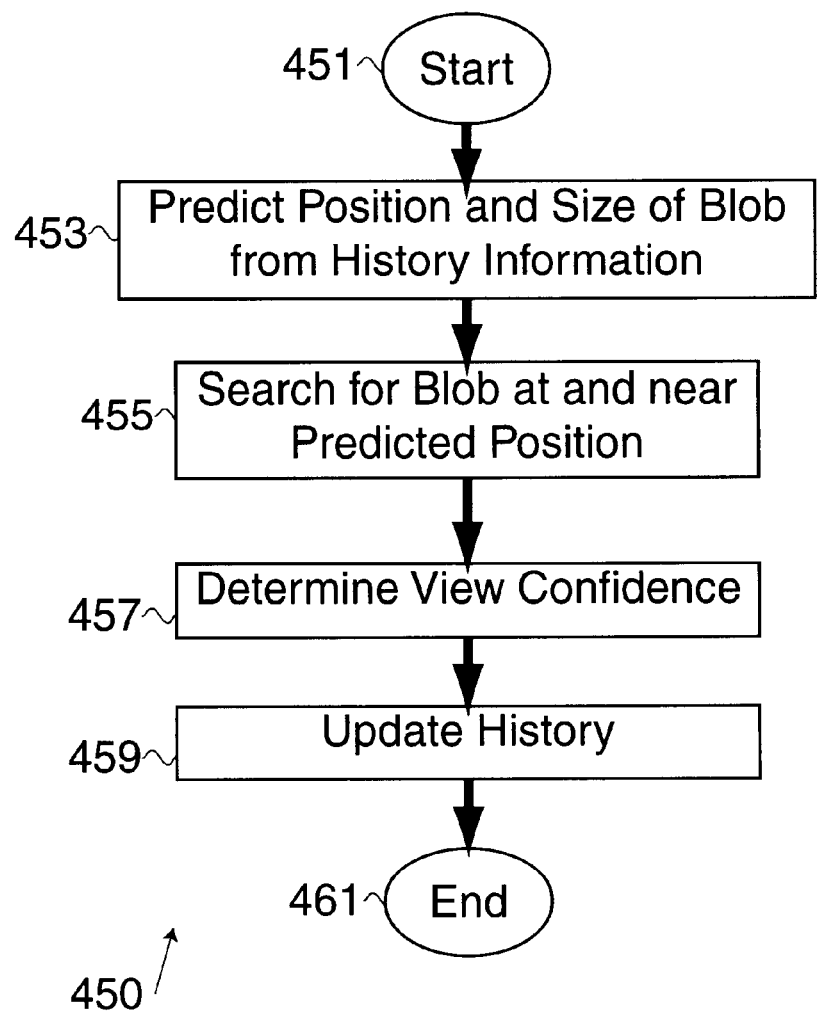
FIG. 4C illustrates a color model tracking process invoked by the 'apply model' procedure 405 of FIG. 4A in accordance with one preferred embodiment.

FIG. 4C illustrates a 'color tracker' process 450 that can be another one of the models invoked by the 'apply model' procedure 405 of FIG. 4A. This type of model tracks a group of pixels in the warped video image that maintain a similar relationship (although possibly a varying relationship) between them (for example, the same shape, color, texture etc.) As previously discussed, such a group of pixels is a blob.

The 'color tracker' process 450 initiates at a 'start' terminal 451 and continues to a 'blob prediction' procedure 453. The 'blob prediction' procedure 453 uses the blob's history to predict the current position, and size of the blob in the panorama. The blob's history can also be used to predict changing color relationships within the blob by monitoring the color map history. Next, a 'blob search' procedure 455 attempts to match the blob with the data in the current frame. The search starts at the blob's predicted position (using the blob's predicted size and color map) and if the blob is not immediately found at the predicted position the 'blob search' procedure 455 will search around the predicted position or trace back to the previously known position to attempt to locate the blob. A 'generate confidence' procedure 457 then generates a value that represents how confident the model is that it was able to find the blob. An 'update history' procedure 459 can then adjust the model's weight depending on how well the model was able to track the blob. Finally, the 'color tracker' process 450 completes through an 'end' terminal 461.

The 'update history' procedure 459 maintains any model-specific history required by the operation of the model. This history can include (among others), color maps, motion vectors, the search region, size and position of the object box, and environmental information such as three-dimensional information about motionless objects in the warped video image. The 'update history' procedure 459 can also adjust the weight of the color tracker model using the same or similar techniques as used in the 'determine model parameters and weight' procedure 333 (for example, by how well the blob is distinguishable from its surroundings).

Similar models can be created following the same or similar structure as shown in FIG. 4B. These models can include a texture model, a shape model, an edge model, an eigen model, etc.

Figure 5:
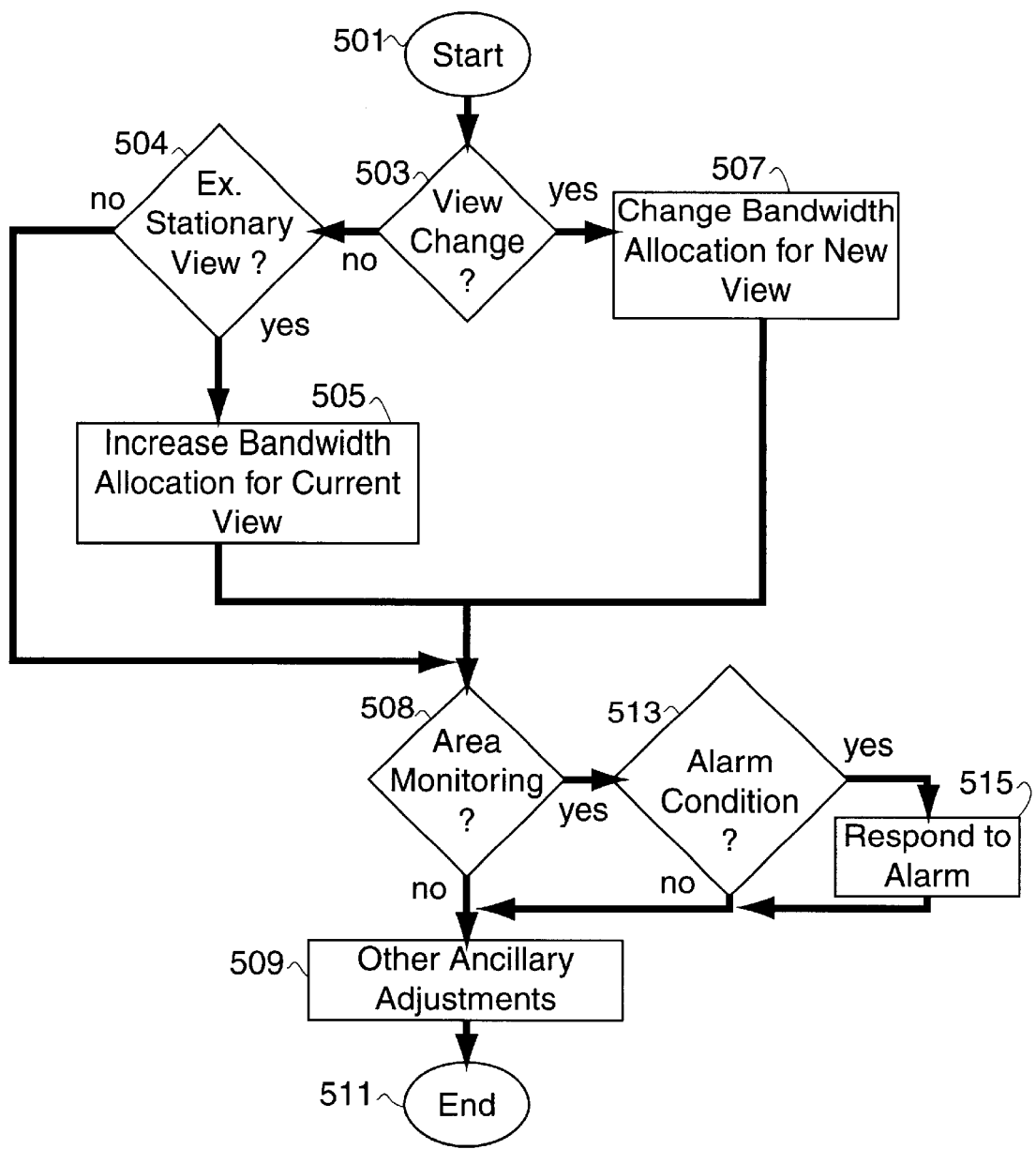
FIG. 5 illustrates an ancillary adjustment process that can be invoked by the 'ancillary operations' procedure 218 of FIG. 2 in accordance with one preferred embodiment.

FIG. 5 illustrates an 'ancillary operation' process 500 that can be invoked by the 'ancillary operations' procedure 218 of FIG. 2 and that initiates at a 'start' terminal 501. The 'ancillary operation' process 500 continues to a 'view change' decision procedure 503 that determines whether the view has changed (either as a result of a user/viewer command, or of the operation of the tracking process). If the view has not changed, the 'ancillary operation' process 500 continues to an 'extended stationary view' decision procedure 504 that determines whether the view has not changed for a sufficient period. If the view has remained stationary for the required period, the 'ancillary operation' process 500 continues to an 'increase bandwidth for current view' procedure 505. The 'increase bandwidth for current view' procedure 505 increases the bandwidth allocated to the currently presented view and reduces the bandwidth allocated to unseen portions of the warped video image using techniques such as those described in the parent application—thus, increasing the quality of the presented view. The 'increase bandwidth for current view' procedure 505 can also trigger a re-weighting of the models to adjust for the improved pixel resolution available from the increased bandwidth available to the view.

However, if the view has changed, the 'ancillary operation' process 500 continues to a 'change bandwidth allocation for new view' procedure 507 that determines whether the changed view has been using lower quality data to generate the view and if so allocates more bandwidth to the portion of the data currently used to generate the view.

Regardless of which branch of the 'view change' decision procedure 503 and the 'extended stationary view' decision procedure 504 is taken, the 'ancillary operation' process 500 eventually continues to an 'area monitoring' decision procedure 508. The 'area monitoring' decision procedure 508 determines whether an area monitoring capability is enabled as is subsequently described.

If area monitoring is not enabled, the 'ancillary operation' process 500 continues to an 'other ancillary adjustments' procedure 509 that implements other enhancements that can be responsive to the state of change of the object-of-interest in the panorama. Finally, the 'ancillary operation' process 500 completes through an 'end' terminal 511.

Looking again at the 'area monitoring' decision procedure 508. If area monitoring is enabled, the 'ancillary operation' process 500 continues to an 'alarm condition' decision procedure 513 that determines whether the object-of-interest has come into proximity an area-of-interest for which intrusions are monitored. If an alarm condition is detected, the 'ancillary operation' process 500 continues to an 'alarm response' procedure 515 that responds to the alarm. The 'alarm response' procedure 515 can respond to the alarm in a variety of ways. Some of these responses include starting a recording mechanism of the warped video image or view, presenting a display on a computer monitor, television or other presentation or display device of the view containing the area-of-interest (or areas) and the triggering object, causing audible and/or visual alarms, and invoking a surveillance response from a security company or the police. The recorded views can be saved for later retrieval and playback.

One skilled in the art will understand from reading this description an area-of-interest and an object-of-interest can be specified in very similar ways. The user/viewer can also specify the alarm type for intrusions or proximity to each specific area-of-interest by any of the object-of-interests. Furthermore, the area-of-interest can also be tracked (but generally not presented) and need not be stationary. Thus, for example, a moving area-of-interest (for example, a car) can be specified as well as an object-of-interest (for example, a dog). One embodiment would present the object-of-interest (for example, by display on a computer screen) but track both the object-of-interest and the area-of-interest. In this case, the embodiment would raise an alarm if the object-of-interest and the area-of-interest eventually came into proximity with each other.

One preferred embodiment of previously described models allows the user/viewer to specify that the tracker can wander to follow changes in the warped video image. Thus, the tracker would detect and follow interesting motion in the warped video image instead of following only one particular object-of-interest specified by the user/viewer. In this instance, there would be no "lost track" condition. Instead, when the object-of-interest was lost (or after a suitable time), the 'recovery' procedure 419 would find other motion and automatically track that motion. This can also be applied to the other models to wander from color change to color change, or texture change to texture change or some combination thereof. These models track a particular condition (motion, color, texture etc.) for a limited time (for example for as long as it remains interesting or until a more interesting condition occurs).

One preferred embodiment includes the capability to select a second view into the warped video image and to identify and track a second object-of-interest while still tracking the first. Thus, multiple objects of interest can be tracked through the warped video image.

Another preferred embodiment allows the object to be selected on a client computer and to have the tracking done by the server computer.

When using a stationary single video camera with a panoramic lens, one skilled in the art will understand that detecting and tracking movement or moving objects is much simplified over the prior art. In particular, because the background does not move in the image (because the camera does not move) movement is simpler to detect. This advantage also extends over multiple stationary cameras covering an area because there is no need to identify and calibrate the overlapping portions of the images from the multiple cameras nor any need to track movement that exits the view of one camera and enters the view of another.

From the foregoing, it will be appreciated that the invention has (without limitation) the following advantages:

1) The ability to track movement or an object through a warped video image.
2) The ability to adjust the bandwidth allocated to different portions of the warped video image that is sent across a network responsive to the tracked object or movement.
3) The ability to monitor an area and to determine when a track movement or object approaches and/or enters an area-of-interest.

4) The ability to automatically select movement or a moving object in a warped video image and to initiate tracking of that object and/or automatically select another movement or moving object.
5) The ability to track movement without the complexity of detecting background movement resulting from a movement of the camera.
6) The ability to track movement with a single camera to avoid the complexities of tracking a movement that exits one camera's field of view and enters another camera's field of view.

Although the present invention has been described in terms of the presently preferred embodiments, one skilled in the art will understand that various modifications and alterations may be made without departing from the scope of the invention. In particular, the order of the programming steps as described are not intended to be limiting. For example, but without limitation, the inventors contemplate practicing the invention using multiple threads of execution, multiple processors, and object-oriented programming practices. In addition, the scope of the invention includes the addition of or replacement of the previously described models. Accordingly, the scope of the invention is not to be limited to the particular invention embodiments discussed herein.

What is claimed is:

1. A computer controlled method comprising steps of:
   receiving a warped annular video image, said warped annular video image comprising a plurality of frames;
   identifying an object-of-interest in a first set of frames of said plurality of frames of the warped annular video image;
   tracking said object-of-interest through a subsequent set of frames of said plurality of frames of the warped annular video image;
   selecting a first view in the subsequent set of frames, wherein the first view includes said object-of-interest; and
   transforming the first view into a video frame suitable for presentation.

2. The computer controlled method of claim 1 wherein each of said plurality of frames include data representing a substantially 360-degree scene that extends through a horizon line.

3. The computer controlled method of claim 1 wherein the step of identifying an object-of-interest in a first set of frames of said plurality of frames of the warped annular video image, further comprises:
   defining a bounding box in a previous video frame; and
   identifying the object-of-interest in the first view corresponding to previous video frame.

4. The computer controlled method of claim 1 wherein said warped annular video image is provided by a data source to a client.

5. The computer controlled method of claim 1 wherein said data source is a server computer, said client is a client computer, and said warped annular video image is provided by sending said warped annular video image over a network from said server computer.

6. The computer controlled method of claim 5 wherein the step of identifying is performed at said server computer.

7. The computer controlled method of claim 5 wherein the step of identifying is performed at said client computer and the step of tracking is performed by said server computer.

8. The computer controlled method of claim 5 further comprising a step of adjusting an allocation of an available bandwidth to one or more portions of said subsequent set of frames responsive to the step of tracking.

9. The computer controlled method of claim 1 further comprising steps of:
   selecting a second view into said warped annular video image;
   identifying a second object-of-interest; and
   tracking said second object-of-interest through said subsequent set of frames.

10. The computer controlled method of claim 1, further comprising recording said video frame for later retrieval.

11. The computer controlled method of claim 1, further comprising recording said warped annular video image for later retrieval.

12. The computer controlled method of claim 1, further comprising displaying said video frame on a display device.

13. The computer controlled method of claim 1 further comprising a step of identifying when said object-of-interest comes into proximity with an area-of-interest.

14. The computer controlled method of claim 13 further including a step of specifying said area-of-interest.

15. The computer controlled method of claim 1 wherein the step of identifying further comprises automatically detecting a first interesting change in said first set of frames as said object-of-interest.

16. The computer controlled method of claim 15 further comprising steps of:
   automatically detecting a second interesting change in said subsequent set of frames; and
   switching said object-of-interest from said first interesting change to said second interesting change.

17. The computer controlled method of claim 16 wherein said first interesting change is a motion.

18. The computer controlled method of claim 16 wherein said second interesting change is a color change, a shape change, a velocity change, a texture change, or a new motion.

19. An apparatus having a central processing unit (CPU) and a memory coupled to said CPU for tracking an object-of-interest in a warped annular video image, said apparatus comprising:
   a receiving mechanism configured to receive said warped annular video image, said warped annular video image comprising a plurality of frames;
   an identification mechanism configured to identify said object-of-interest in a first set of frames of said plurality of frames of the warped annular video image;
   a tracking mechanism configured to track said object-of-interest identified by the identification mechanism through a subsequent set of frames of said plurality of frames of the warped annular video image;
   a selection mechanism configured to select a first view in the subsequent set of frames, wherein the first view includes said object-of-interest; and
   a transformation mechanism configured to transform the first view into a video frame suitable for presentation.

20. The apparatus of claim 19 wherein each of said plurality of frames include data representing a substantially 360-degree scene that extends through a horizon line.

21. The apparatus of claim 19 further comprising a viewer input mechanism configured to receive input from a viewer to define a bounding box in a previous video frame, wherein said identification mechanism is configured to identify the object-interest in the first view corresponding to the previous video frame.

22. The apparatus of claim 19 wherein said warped annular video image is provided by a data source to a client.

23. The apparatus of claim 19 wherein said data source is a server computer, said client is a client computer, and said warped annular video image is provided over a network from said server computer to said client computer.

24. The apparatus of claim 23 further comprising a bandwidth adjustment mechanism configured to adjust an allocation of an available bandwidth to one or more portions of said subsequent set of frames responsive to the tracking mechanism.

25. The apparatus of claim 23 wherein the selection mechanism is located at said client computer and the tracking mechanism is located at said server computer.

26. The apparatus of claim 19 further comprising:
a second selection mechanism configured to select a second view into said warped annular video image;
a second identification mechanism configured to identify a second object-of interest; and
a second tracking mechanism configured to track said second object-of-interest through said subsequent set of frames.

27. The apparatus of claim 19, further comprising a storage mechanism configured to record said video frame for later retrieval.

28. The apparatus of claim 19 further comprising a storage mechanism configured to record said warped annular video image for later retrieval.

29. The apparatus of claim 19 further comprising a display device configured to display said video frame.

30. The apparatus of claim 19 further comprising an alarm mechanism configured to identify when said object-of-interest comes into proximity with an area-of-interest.

31. The apparatus of claim 30 further including a specification mechanism configured to specify said area-of-interest.

32. The apparatus of claim 19 wherein the identification mechanism further comprises a automatic detection mechanism configured to detect a first interesting change in said first set of frames as said object-of-interest.

33. The apparatus of claim 32 further comprising:
a change detection mechanism configured to automatically detect a second interesting change in said subsequent set of frames; and
a switch mechanism configured to switch said object-of-interest from said first interesting change to said second interesting change.

34. The apparatus of claim 33 wherein said first interesting change is a motion.

35. The apparatus of claim 33 wherein said second interesting change is a color change, a shape change, a velocity change, a texture change, or a new motion.

36. A computer program product including:
a computer usable data carrier having computer readable code embodied therein for causing a computer to track an object-of-interest in a warped annular video image, said computer readable code including:
computer readable program code configured to cause said computer to effect a receiving mechanism configured to receive said warped annular video image, said warped annular video image comprising a plurality of frame;
computer readable program code configured to cause said computer to effect an identification mechanism configured to identify said object-of-interest in a first set of frames of said plurality of frames of the warped annular video image;
computer readable program code configured to cause said computer to effect a tracking mechanism configured to track said object-of-interest identified by the identification mechanism through a subsequent set of frames of said plurality of frames of the warped annular video image;
computer readable program code configured to cause said computer to effect a selection mechanism configured to select a first view in the subsequent set of frames, wherein the first view includes said object-of-interest; and
computer readable program code configured to cause said computer to effect a transformation mechanism configured to transform the first view into a video frame suitable for presentation.

37. The computer program product of claim 36 wherein the computer usable data carrier is a computer readable media.

38. The computer program product of claim 36 wherein the computer usable data carrier is a carrier wave.

39. The computer program product of claim 36 wherein each of said plurality of frames include data representing a substantially 360-degree scene that extends through a horizon line.

40. The computer program product of claim 36 further comprising computer readable program code configured to cause said computer to effect a viewer input mechanism configured to receive input from a viewer to define a bounding box in a previous video frame, wherein said identification mechanism is configured to identify the object-interest in the first view corresponding to the previous video frame.

41. The computer program product of claim 36 wherein said warped annular video image is provided by a data source to a client.

42. The computer program product of claim 41 further comprising computer readable program code configured to cause said computer to effect a bandwidth adjustment mechanism configured to adjust an allocation of an available bandwidth to one or more portions of said subsequent set of frames responsive to the tracking mechanism.

43. The computer program product of claim 36 further comprising:
computer readable program code configured to cause said computer to effect a second selection mechanism configured to select a second view into said warped annular video image;
computer readable program code configured to cause said computer to effect a second identification mechanism configured to identify a second object-of interest; and
computer readable program code configured to cause said computer to effect a second tracking mechanism configured to track said second object-of-interest through said subsequent set of frames.

44. The computer program product of claim 43 further comprising computer readable program code configured to cause said computer to effect a storage mechanism configured to record said first video frame for later retrieval.

45. The computer program product of claim 43 further comprising computer readable program code configured to cause said computer to effect a storage mechanism configured to record said warped annular video image for later retrieval.

46. The computer program product of claim 43 further comprising computer readable program code configured to cause said computer to effect a display device configured to display said first Video frame.

47. The computer program product of claim 36 further comprising computer readable program code configured to cause said computer to effect an alarm mechanism configured to identify when said object-of-interest comes into proximity with an area-of interest.

48. The computer program product of claim 47 further including computer readable program code configured to cause said computer to effect a specification mechanism configured to specify said area-of-interest.

49. The computer program product of claim 34 wherein the identification mechanism further comprises computer readable program code configured to cause said computer to effect an automatic detection mechanism configured to detect a first interesting change in said first set of frames as said object-of-interest.

50. The computer program product of claim 49 further comprising:

computer readable program code configured to cause said computer to effect a change detection mechanism configured to automatically detect a second interesting change in said subsequent set of frames; and computer readable program code configured to cause said computer to effect a switch mechanism configured to switch said object-of-interest from said first interesting change to said second interesting change.

51. The computer program product of claim 50 wherein said first interesting change is a motion.

52. The computer program product of claim 50 wherein said second interesting change is a color change, a shape change, a velocity change, a texture change, or a new motion.

* * * * *